United States Patent [19]

Wade et al.

[11] Patent Number: 4,538,411
[45] Date of Patent: Sep. 3, 1985

[54] AUTOMATIC INITIATION SYSTEM FOR REGENERATING A PARTICULATE FILTER TRAP

[75] Inventors: Wallace R. Wade, Farmington Hills; Vemulapalli Durga N. Rao, Bloomfield Township, Oakland County, both of Mich.

[73] Assignee: Ford Motor Company, Dearborn, Mich.

[21] Appl. No.: 620,044

[22] PCT Filed: Dec. 27, 1983

[86] PCT No.: PCT/US83/02069

§ 371 Date: Dec. 27, 1983

§ 102(e) Date: Dec. 27, 1983

[87] PCT Pub. No.: WO85/02883

PCT Pub. Date: Jul. 4, 1985

[51] Int. Cl.³ .............................................. F01N 3/02
[52] U.S. Cl. .................................... 60/274; 55/283; 55/DIG. 30; 60/286; 60/288; 60/311
[58] Field of Search ............... 60/274, 286, 311, 288; 55/283, DIG. 30

[56] References Cited

U.S. PATENT DOCUMENTS 3,910,040 10/1975 Garcea ................................. 60/288
4,281,512 8/1981 Mills ..................................... 55/283

FOREIGN PATENT DOCUMENTS 509 1/1981 Japan ..................................... 60/286

Primary Examiner—Douglas Hart
Attorney, Agent, or Firm—Joseph W. Malleck; Roger L. May

[57] ABSTRACT

A method and apparatus is disclosed for initiating the energization of a regenerative apparatus used with a particulate filter trap having a porosity effective to extract particulates from the exhaust gas flow of an internal combustion engine. The method comprises: (1) sensing the actual pressure drop across the filter trap and sensing the pressure drop across an open channel simulative filter structure; (2) converting the pressure drops to proportional voltages and ratioing the voltage of the filter trap pressure drop to the product of a constant and the voltage of the simulative filter structure pressure drop; and (3) using the resultant voltage ratio to control the energization of the regeneration apparatus when the output exceeds a predetermined allowable limit, e.g., 2–8 volts. The apparatus employs a simulative filter structure fabricated of the same monolithic honeycomb celled ceramic as is the filter trap, except that the structure has a controlled porosity effective to permit the passage of substantially all particulates in the gas flow therethrough.

9 Claims, 2 Drawing Figures

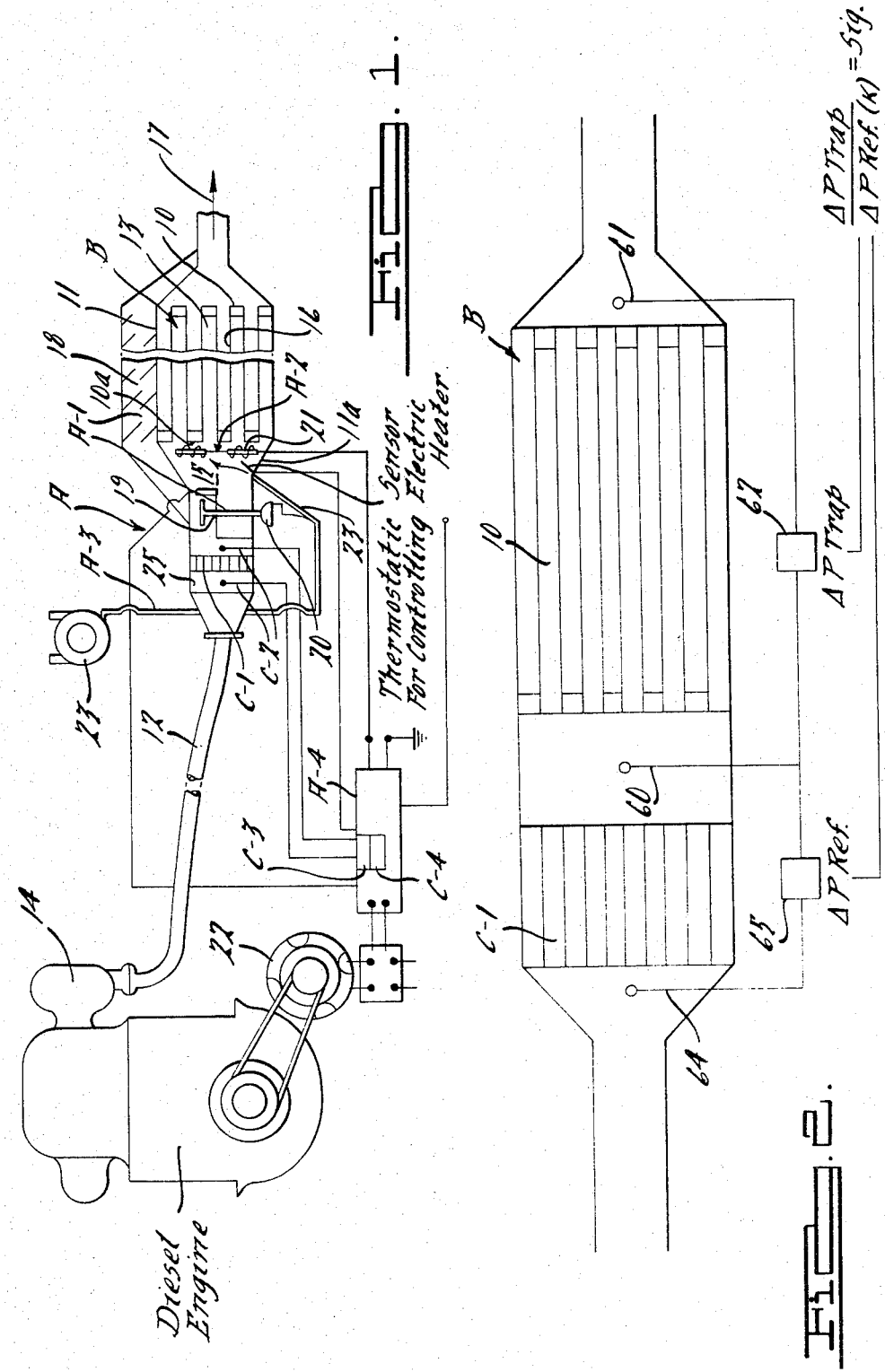

AUTOMATIC INITIATION SYSTEM FOR REGENERATING A PARTICULATE FILTER TRAP

TECHNICAL FIELD

The invention relates to the technology of regenerating a particulate trap used to remove particulates from the exhaust gases of an automotive internal combustion engine and, more particularly, to the method and apparatus for more effectively initiating the regeneration cycle. This application is an improvement related to the disclosures, by the same inventors, in copending U.S. applications Ser. No. 598,552, Ser. No. 573,277, and Ser. No. 573,972.

BACKGROUND OF THE INVENTION AND PRIOR ART STATEMENT

Particulate emissions from an engine can be reduced with a particulate filter trap and a regeneration system to periodically clean the filter trap of particulates by incineration. Generally, durable and acceptable filter particulate traps have been developed by the art which have included wire mesh (see U.S. Pat. No. 3,499,269) and, more advantageously, rigid ceramics, perferably in a honeycomb monolithic cellular wall structure (see U.S. Pat. Nos. 4,276,071; 4,329,162; and 4,340,403).

Ceramic monolithic honeycomb celled filter traps have shown 60–80% particulate collection efficiency for applications in diesel powered passenger cars and light and heavy duty trucks. The collection of particulates in the filter trap results in an increasing exhaust gas back pressure with mileage accumulation. After a relatively short driving period, which depends on the filter trap volume and particulate level entrained in the exhaust gas flow, the filter trap will require regeneration to minimize the loss in fuel economy and performance associated with the increased exhaust gas back pressure. Regeneration is accomplished by raising the temperature of the particulates on the inlet face of the filter trap to approximately 1200° F. using a fuel fed burner or electrical heating system.

Previously published schemes used to initiate regeneration have all used a manually operated trigger which, of course, can lead to inadequate regeneration, the operator failing to initiate the regeneration system precisely when it is needed. One attempt to provide an automatic initiation system is disclosed in copending U.S. Application Ser. No. 463,687, invented by the inventors herein and assigned to the assignee herein. Such system uses an on-board computer system together with a differential pressure sensor. The computer memory contains an entire map of the clean trap back pressure as a function of engine speed, load (fuel delivery), and exhaust temperature. A differential pressure sensor is used to provide the actual instantaneous pressure drop across the trap. This instantaneous trap pressure drop is compared with the clean trap pressure drop at the instantaneous engine speed, load, and exhaust temperature. If the trap pressure drop is greater than the specified multiple of the clean trap pressure drop, then regeneration is automatically initiated.

This system is complex and expensive because it requires a memory of clean trap pressures at various speed, fuel delivery, and exhaust temperature combinations. It would be of significant technical help if the need for an on-board computer could be eliminated while still providing for an automatic initiation of the regenerative apparatus according to the needs of the filter trap.

SUMMARY OF THE INVENTION

The invention is a method and apparatus for initiating the energization of a regeneration apparatus used with a particulate filter trap having a porosity effective to extract particulates from the exhaust gas flow of an internal combustion engine.

The method comprises: (a) sensing the actual pressure drop across the filter trap placed in the flow of exhaust gases: (b) sensing the actual pressure drop across a simulative filter structure also placed in the flow of exhaust gases, the simulative filter structure having a porosity effective to allow the passage of particulates therethrough; (c) comparing the sensed value of (a) to the product of the sensed value of (b) and a reference multiple needed to make the pressure values equal when the filter trap is free of particulates, and converting such ratio to an electric signal; and (d) energization of the regeneration apparatus when the signal exceeds an allowable electric signal limit.

Preferably, the method: (1) converts the sensed pressure to a proportional voltage signal and uses an allowable limit in the range of 2–8 volts for said electric signal; (2) carries out conversion of step (c) by use of pressure transducers and a voltage dividing device effective to compare voltage signals of each of the sensed pressures to generate the electrical signal proportional thereto; (3) has the filter trap and simulative filter structure each fabricated from a monolithic ceramic honeycomb celled material; and (4) stations the simulative filter structure downstream from the filter trap a distance advantageously in the range of 0.2–10 inches.

The apparatus for initiating regeneration comprises: (a) a simulative filter structure, in the exhaust gas flow, having a porosity effective to permit the passage of substantially all particulates therethrough: (b) means to sense the actual pressure drop across the filter trap and to sense the actual pressure drop across the simulative filter structure; (c) means for converting the sensed pressure drops to proportional voltage values and ratioing the voltage value for the actual pressure drop across the filter trap to the product of the voltage value for the actual sensed pressure drop across the simulative filter structure and a reference multiple needed to make the voltage values equal when the filter trap is free of particulates; and (d) limit means permitting the voltage ratio to control the energization of the regeneration system when the voltage ratio exceeds an allowable limit.

SUMMARY OF THE DRAWINGS

FIG. 1 is a schematic diagram of an automotive filter trap and regeneration system employing the principles of this invention; and FIG. 2 is an enlarged schematic diagram of the filter trap, simulative filter structure, and pressure sensor/transducer apparatus used to obtain the automatic initiation of this invention.

BEST MODE FOR CARRYING OUT THE INVENTION

In this invention, automatic initiation of the regeneration apparatus is achieved without an on-board computer and without sensors to monitor engine speed, fuel delivery, and exhaust gas temperature. A simple, open channel, ceramic honeycomb celled filter-like structure C-1 is disposed in the exhaust gas flow to simulate a clean filter trap under all operating conditions. The simulative filter structure has a porosity sufficiently large to permit the passage of substantially all particulates therethrough at all times. Thus, when the pressure drop across such simulative filter structure is sensed and compared to the actual pressure drop across the filter trap, a proportioned signal can be generated which is indicative of the actual particulate loading in the filter trap B under any operating condition. When such signal exceeds an allowable limit, it can be used to initiate or trigger the regeneration cycle. The invention provides for a more fail safe method of initiation and provides a more simple and economical initiation system that is easier to fabricate.

METHOD

The method comprises essentially the following steps (refer to FIG. 2).

1. The actual pressure drop ($\Delta P$ trap) across the filter trap B is sensed by pressure probes 60 and 61 stationed in the exhaust gas flow and respectively immediately upstream and immediately downstream of the filter trap body 10. The difference in sensed pressure by each of the probes 60 and 61 is compared in pressure transducer 62 (carried in a control box A-4 contained remote from the filter trap).

2. The actual pressure drop ($\Delta P$ reference across a simulative filter structure C-1, disposed in the exhaust gas flow (here shown stationed upstream from the filter trap body 10 a distance preferably in the range of 0.2-10 inches), is sensed by pressure probes 64 and 60 stationed respectively immediately upstream and downstream of the structure C-1. The simulative structure has a porosity effective to allow the passage of substantially all particulates therethrough. The difference in sensed pressures by each of the probes 64 and 60 is compared in pressure transducer 65 (also carried in control box A-4 remote from the filter trap).

3. The pressure drops are converted to proportional voltage signals; the voltage signal for $\Delta P$ trap is ratioed or compared to the product of the voltage signal for the pressure drop $\Delta P$ reference and a reference multiple (K) determined as the factor necessary to make the pressure drop values equal when the filter trap is free of particulates.

4. This voltage signal ratio is used to control the energization of the regeneration apparatus A when the signal exceeds an allowable signal limit. The allowable limit is preferably in the range of 2-8 volts.

APPARATUS

The basic apparatus components, by which the method is carried out, broadly includes (see FIG. 1): a regeneration apparatus A comprising an exhaust flow diverting means A-1, a heating means A-2, means providing an oxygen carrying heat transfer medium A-3, and a control means A-4; a filter trap B; and a regenerative initiating apparatus C comprising a simulative filter structure C-1, pressure drop sensors C-2, transducer-voltage ratioing means C-3, and comparator means C-4.

The filter trap B has a monolithic ceramic honeycomb celled body 10 supported and contained in a metallic housing 11, the front portion of the housing 11a guiding the flow of exhaust gases from channel 12 through the front face 10a of the monolithic filter trap. The monolithic ceramic honeycomb celled body may be similar to that used for carrying a catalyst material for conversion of gases from a gasoline engine. The monolithic body contains parallel aligned channels 13 (shown in FIG. 2) constituting the honeycomb cells. The ends of the channels are alternately blocked with high temperature ceramic cement at the front and at the rear so that all of the inlet flow gas must pass through the porous side walls 16 of the channels 13 before exiting through a rear opened channel of the filter trap. The side walls have a porosity small enough and effective to extract particulates from the exhaust gas flow of the internal combustion engine. This type of monolithic ceramic body provides very high filtration surface area per unit of volume. For example, a 119 cubic inch filter trap of this type with 100 cells per square inch and 0.017 inch wall thickness will provide approximately 1970 square inches of filtering surface area, and the filtering surface area per unit volume for such a filter trap would be about 16.6 square inches per cubic inch. The channels are all preferably aligned with the direction of the flow 17 through the trap. When the particulates collect on the trap, they will nest within the porosity of the walls which are spaced along the direction of flow. Thus, there can be a generally uniform distribution of particulates along the length of the trap. Preferably, the monolithic structure has an oval cross-section with a large frontal face 10a of 24-33 square inches, the axes of the oval preferably have a dimension of 4-5 inches and 7-8 inches, respectively.

The exhaust flow diverting means A-1 of the regeneration apparatus A comprises a bypass channel 18 defined here as a conduit effective to carry the exhaust gases from diesel engine exhaust manifold 14 around the filter trap B. The exhaust flow in channel 12 is diverted from communicating with the frontal interior 15 of the filter trap housing by a diverter valve assembly; the diverter valve may be a poppet type valve 19 actuated by a vacuum motor 20 to move the valve from a normally biased position, closing off communication with the bypass channel 18, to an acutated position where the valve closes off communication with the frontal interior space 15 of the filter trap housing. The vacuum motor 20 is electrically actuated under the control of means A-4.

The heating means A-2 comprises essentially one or more electrical resistance elements 21, and related flow control elements which are disclosed more fully in copending U.S. Application Ser. No. 573,277, invented by the inventors herein and assigned to the assignee herein, the disclosure of which is incorporated herein by reference. The electrical resistance elements 21 preferably are sheathed nickel chromium wire elements encased within magnesium oxide powder contained by the sheath. The elements are sized to have a resistance heating capacity sufficient to raise the temperature of a low flow of heat transfer medium to a temperature of about 1100° F. within a period of 1.5-3.5 minutes. The heating element surface temperature itself will reach 1400° F. during this period. The elements receive electrical energy from an engine driven alternator 22, the supply of energy being unregulated to facilitate obtaining the necessary amount of electrical energy. The elements are characterized by the ability to provide satisfactory heating with 800-1750 watts at 20-80 volts, each element having a resistance of about 2.4 ohms. Each of the electrical resistance elements may be preferably configured as a spiral, contained in a common plane, extending transversely across the direction of flow of the heat transfer medium. The configured heating elements are supported in a secure position by ceramic holding sleeve assembly received in the metallic housing wall 11.

After the heating elements have been heated to about 1400° F. (surface temperature), following initiation of the regenerative cycle, oxygen carrying fluid medium (air) is injected by an air pump means A-3 through the heating means A-2 and the filter trap body 10 to transfer heat therebetween and support incineration of the particulates in the absence of the diverted exhaust gas. The air pump means is electronically actuated by control means A-4 at an appropriate time interval.

The control means A-4 responds to a transmitted signal from the initiating apparatus C to actuate several timed electrical events in sequence. The timed events include: (1) actuating the vacuum motor 20 to operate the bypass valve 19 substantially simultaneously with the closing of circuit to energize the heating elements 21, (2) closing a circuit to energize an air pump motor 23 of air pump means A-3 to transmit a supply of air through conduit 24 to the frontal interior space 15 of the filter trap after the heater elements have attained a surface temperature of about 1400° F.; (3) interrupting the supply of electrical energy to the heating elements after about one-half of the total oxidizing cycle time has elapsed (which would translate to about four minutes for a preferable cycle time of eight minutes here); and (4) cessation of the air pump means and deactivation of the diverter valve at the completion of the full oxidizing cycle time or when the oxidation of the particulates is stabilized and self-sustaining.

The regenerative initiating apparatus comprises ceramic honeycomb celled structure C-1 which is disposed in the exhaust gas flow upstream from the ceramic honeycomb celled filter trap B, but preferably closely spaced to the filter trap. The spacing can be as close as 0.2 inch, sufficient to permit insertion of a pressure probe therebetween or as distant as several inches, preferably up to 10 inches, provided the structure A-1 is exposed to only the exhaust gas flow. However, greater spacing than 10 inches may allow temperature differences between the exhaust gas passing through the filter trap and through the simulative structure to affect accuracy of the sensing system. The simulative filter structure can be constructed of the same monolithic structure used to fabricate the filter trap, but having an open channel porosity, that is, a porosity which is effective to permit the passage of substantially all particulates of engine exhaust gas therethrough.

The simulative structure may alternatively be part of a catalytic regeneration fuel burner. Although illustrated as located upstream from the filter trap, the structure can also be located downstream with similar satisfactory sensing results. The structure A-1 is shown as a thick disc spanning across the flow channel section 25 to ensure that all of the exhaust gas flow passes therethrough to obtain a reliable pressure drop reading.

The pressure drop sensors C-2 can be of conventional construction such as thin tubes which have an open ended probe (60-61-64) inserted into the flow which is to be sensed. The instantaneous pressure is transmitted along such probe tube with approximately the speed of sound to receiving pressure transducer/voltage ratioing means C-3. Probes 60 and 61 are needed to sense the pressure differential (pressure drop $\Delta P$ trap) across the filter trap, and probes 64 and 60 are needed to sense the pressure drop ($\Delta P$ reference) across the simulative structure. The pressure transducers 62 and 65 can be of conventional capacitance type construction effective to convert a pressure differential to a proportional voltage output as an electric signal. The voltage signal from the transducer 65 is multiplied by a fixed constant value (determined at the factory) by use of a conventional voltage multiplier device to ensure that the $\Delta P$ trap and $\Delta P$ reference are equal when the filter trap is clean. The multiple factor is preferably in the range of 10–20, but is dependent on the size of the filter trap, resolution capabilities of the transducers, and the degree of porosity in the simulative filter structure. The multiple factor can be determined by an empirical cold air flow test at the factory using the actual components of the system. Pressure transducers would separately measure $\Delta$ trap and $\Delta$ reference; if, for example, trap read 10 and reference was 1.0, then the multiple factor would be selected as 10. The voltage signals are then divided by a conventional electronic device capable of dividing two input voltages to produce a resultant output voltage which will be indicative of trap particulate loading.

The divided or ratioed voltage signal is scrutinized by a comparator circuit C-4 to determine if it exceeds a predetermined allowable limit before it is used to control energization of the regenerative apparatus by control means A-4. The allowable limit is preferably in the range of 2–8 volts, which means that the back pressure in the filter trap can be as little as twice the pressure drop when it is clean, or the back pressure in the filter trap can be as much as eight times the clean trap back pressure before initiation occurs. If an allowable limit greater than eight times is used for initiation, a dangerous condition may be created, whereby the exothermic reaction during particulate oxidation may thermally affect some portions of the apparatus.

The transducer/ratioing means C-3 and comparator circuit, as well as the control means A-4, are located in a non-hostile environment such as under the dashboard of the automotive passenger compartment.

Monitoring the reference pressure drop across the open channel ceramic honeycomb structure C-1 will always provide a signal proportional to the clean trap pressure drop for the instantaneous exhaust flow rate. Dividing the actual trap pressure drop by the product of a constant and the reference pressure drop, will provide an electrical signal proportional to trap loading and which trap loading signal is independent of engine speed, fuel delivery, and exhaust temperature. Thus, when the trap loading is greater than the allowable limit, an electrical signal will be provided to start the oxidizing or regeneration process.

We claim:

1. A method of initiating the energization of a regeneration apparatus used with a particulate filter trap having a porosity effective to extract particulates from the exhaust gas flow of an internal combustion engine, said method comprising:
    (a) sensing the actual pressure drop across said filter trap placed in the flow of exhaust gas;
    (b) sensing the actual pressure drop across a simulative filter structure also placed in the flow of said exhaust gas flow, said simulative filter structure having a porosity effective to allow the passage of particulates therethrough;
    (c) comparing the sensed value of (a) to the sensed value of (b) multiplied by a reference multiple needed to make the pressure values equal when the filter trap is free of particulates;

(d) converting the ratio of step (c) to an electric signal; and (e) using said electric signal to control the energization of said regeneration apparatus when said signal exceeds an allowable electric signal limit.

2. The method as in claim 1, in which said allowable limit is in the range of 2-10.

3. The method as in claim 1, in which said conversion of step (d) is carried out by use of a pressure transducer effective to compare each of said sensed pressures and to generate an electrical signal proportional thereto.

4. The method as in claim 1, in which said filter trap and said simulative filter structure are each comprised of a monolithic ceramic honeycomb celled material.

5. The method as in claim 1, in which said simulative filter structure is placed in the exhaust gas flow downstream from said filter trap.

6. An apparatus for initiating the energization of a regeneration system used with a particulate filter trap having a porosity placed to extract particulates from the exhaust gas flow of an internal combustion engine, comprising:

(a) a simulative filter structure in said exhaust gas flow and having a porosity effective to allow the passage of substantially all particulates therethrough;

(b) means to sense the actual pressure drop across said filter trap and to sense the actual pressure drop across said simulative filter structure;

(c) transducer means for ratioing the actual sensed pressure drop across said filter trap to the actual sensed pressure drop across said simulative filter structure multiplied by a reference multiple needed to make the pressure values equal when the filter trap is free of particulates, and for converting the ratio to an electric signal; and (d) limit means permitting said electric signal to control the energization of said regeneration system when said signal exceeds an allowable electric signal limit.

7. The apparatus as in claim 6, in which limit means permits energization when said signal is in the range of 2-10.

8. The apparatus as in claim 6, in which both said filter trap and simulative filter structure are comprised of a monolithic ceramic honeycomb celled material.

9. The apparatus as in claim 6, in which said simulative filter structure is placed in the exhaust gas flow downstream from said filter trap.

* * * * *